United States Patent
Bode et al.

(10) Patent No.: US 11,093,628 B2
(45) Date of Patent: Aug. 17, 2021

(54) CROSS-DOMAIN CONTENT-LIFECYCLE MANAGEMENT

(71) Applicant: INTERNATIONAL BUSINESS MACHINES CORPORATION, Armonk, NY (US)

(72) Inventors: Christopher C. Bode, Cary, NC (US); Naina Singh, Cary, NC (US); Marci Devorah Formato, Clintondale, NY (US)

(73) Assignee: International Business Machines Corporation, Armonk, NY (US)

(*) Notice: Subject to any disclaimer, the term of this patent is extended or adjusted under 35 U.S.C. 154(b) by 364 days.

(21) Appl. No.: 16/275,842

(22) Filed: Feb. 14, 2019

(65) Prior Publication Data

US 2020/0265150 A1     Aug. 20, 2020

(51) Int. Cl.
*G06F 21/62*     (2013.01)

(52) U.S. Cl.
CPC .. *G06F 21/6209* (2013.01); *G06F 2221/2101* (2013.01)

(58) Field of Classification Search
CPC ......... G06F 21/6209; G06F 2221/2101; G06F 21/6218; H04L 63/0823; H04L 63/20;
(Continued)

(56) References Cited

U.S. PATENT DOCUMENTS 8,438,630 B1   5/2013  Clifford
8,925,037 B2   12/2014 Marino et al.
(Continued)

FOREIGN PATENT DOCUMENTS

WO   WO2017010455 A1   1/2017

OTHER PUBLICATIONS

Rech et al., "A Decentralized Service-Platform towards Cross-Domain Entitlement Handling," 2019 IEEE International Conference on Blockchain (Blockchain) Year: 2019 | Conference Paper | Publisher: IEEE.*

(Continued)

*Primary Examiner* — Roderick Tolentino
(74) *Attorney, Agent, or Firm* — Schmeiser, Olsen & Watts; Maeve M. Carpenter

(57) ABSTRACT

A content-lifecycle management system (CLMS) intercepts a request to perform an action upon a data object in a domain of a multi-domain computing environment during a certain phase of the object's lifecycle. The CLMS retrieves data and rules from a cross-domain distributed ledger that is accessible throughout the multi-domain environment. The retrieved information includes content-lifecycle management policies that control which actors can perform certain types of actions upon specific data objects during various lifecycle phases. The ledger also describes and classifies actors, dependency relationships between storage and infrastructure components of the environment, and the results of past requests. If the CLMS, using the ledger information, determines that performing the requested action would neither disrupt access to the data object nor be prohibited by the policies, the CLMS directs an appropriate content-management technology to perform the action, updates the ledger, and reports any rejected requests to other lifecycle-management components.

16 Claims, 7 Drawing Sheets

(58) Field of Classification Search
CPC ... H04W 12/06; H04W 8/005; G06Q 2220/10
See application file for complete search history.

(56) References Cited

U.S. PATENT DOCUMENTS

| | | | |
|---|---|---|---|
| 9,154,499 | B2 | 10/2015 | Stevens |
| 9,160,757 | B1 | 10/2015 | Guo et al. |
| 9,286,477 | B2 | 3/2016 | Sobel et al. |
| 9,436,821 | B2 | 9/2016 | Antoun et al. |
| 10,057,243 | B1* | 8/2018 | Kumar ................... H04L 9/321 |
| 2016/0212133 | A1 | 7/2016 | Chenard et al. |
| 2017/0092060 | A1* | 3/2017 | Toohey ................. G06F 16/254 |
| 2017/0300978 | A1 | 10/2017 | Narasimhan et al. |
| 2018/0205748 | A1 | 7/2018 | Gurkok et al. |
| 2018/0213005 | A1 | 7/2018 | Murthy et al. |
| 2018/0260341 | A1 | 9/2018 | McHugh et al. |
| 2018/0278505 | A1 | 9/2018 | Sarin |
| 2019/0116036 | A1* | 4/2019 | Sabharwal ............ H04L 9/3239 |
| 2019/0141536 | A1* | 5/2019 | Bachmutsky ......... H04W 12/08 |
| 2019/0268284 | A1* | 8/2019 | Karame ................ H04L 9/3236 |
| 2019/0370358 | A1* | 12/2019 | Nation ................. H04L 9/0643 |
| 2019/0379699 | A1* | 12/2019 | Katragadda ............ G06N 3/006 |
| 2019/0385269 | A1* | 12/2019 | Zachary ................. G07C 5/008 |
| 2020/0014529 | A1* | 1/2020 | Kanza ................... H04L 9/3247 |
| 2021/0089676 | A1* | 3/2021 | Ford ..................... H04L 9/3218 |

OTHER PUBLICATIONS

Zheng et al., "Blockchain-Based Privacy Protection Unified Identity Authentication," 2019 International Conference on Cyber-Enabled Distributed Computing and Knowledge Discovery (CyberC) Year: 2019 | Conference Paper | Publisher: IEEE.*

Dorri, Ali et al; MOF-BC: A Memory Optimized and Flexible BlockChain for Large Scale Networks; Journal of LaTeX; Jan. 16, 2018; 43 pages.

Ramachandran et al.; "SmartProvenance: A Distributed, Blockchain Based Data Provenance System", CODASPY'18 8th ACM International Conference on, Mar. 19-21, 2018, pp. 35-42.

Salman et al.; "Security Services Using Blockchains: A State of the Art Survey", IEEE Communications Surveys & Tutorials, Aug. 7, 2018, pp. 1-23.

De Ryck et al.; "CsFire: Transparent Client-Side Mitigation of Malicious Cross-Domain Requests", ESSoS'10 2nd ACM International Conference on, Feb. 3-4, 2010, pp. 18-34.

* cited by examiner

CROSS-DOMAIN CONTENT-LIFECYCLE MANAGEMENT

BACKGROUND

The present invention relates in general to content-lifecycle management and in particular to globally protecting content in a multi-domain computing environment from accidental deletion or disruption at various phases of the content's lifecycle.

Web content, hosted user data, mission-critical business intelligence, database records, and other types of computerized data pass through various phases during each data item's lifecycle. These lifecycle stages or phases may each be governed by phase-specific policies and constraints. For example, during an initial development phase, a product-design document could be editable by only a certain design team and access to the document may be restricted to a particular Engineering network. During a later production phase, the document would be granted read-only access to a manufacturing group and may be subject to certain backup and check-in/check-out policies. When the product becomes eligible for technical support, a support-phase document-lifecycle policy would give a customer-support operation read-only access. In a final post-production phase of the design document's lifecycle, when the product is no longer being actively marketed or supported, yet another set of archiving, access, and data-retention policies would control how workers, applications, and system tools are allowed to access and manipulate the document.

In a distributed, virtualized, enterprise, or other multi-domain information-technology (IT) environment, specialized technologies may be required to manage data items at various phases of the document's lifecycle. This specialization can be especially important in a large-scale, distributed computing environment where large numbers of data items demand data-specific or phase-specific considerations. However, specialized systems tailored to a particular type of data or to a particular lifecycle phase may not be able to interoperate or directly communicate with each other due to interface differences, inconsistent or proprietary communications mechanisms, or security-constrained scope. Therefore, synchronizing technologies that attempt to manage data at multiple lifecycle stages can be facilitated by a coordinating management technology.

A content-lifecycle management system or equivalent technology is an existing solution for overseeing the management of a data item throughout its lifecycle. Although still in their infancy, such systems may attempt to span multiple functions, such as project management, information management, information architecture, and Web-site governance.

Current content-lifecycle management systems generally have scope that ranges through a subset of domains comprised by a multi-domain computing environment. For example, a lifecycle-management system that manages policies controlling production and support data, even if the system is not be authorized to revise, implement, or even identify policies related to that same data at other phases of the data's lifecycle.

SUMMARY

Embodiments of the present invention comprise content-lifecycle management systems, methods, and computer program products that perform cross-domain content-lifecycle management. A content-lifecycle management system receives a request to perform an action upon a data object that, during the current phase of its lifecycle, is accessible in a particular domain of a multi-domain computing environment. The system retrieves information from a cross-domain ledger that is stored in a manner that makes the ledger accessible from multiple domains of the computing environment. The ledger may be implemented as a distributed data structure, such as a blockchain. The retrieved information includes: an Actors listing that describes characteristics of human actors or computerized systems that are allowed to access data in the multi-domain computing environment; a Relationships listing that identifies dependency relationships among storage devices, infrastructure components, and data items in the multi-domain computing environment, where each relationship specifies that disrupting access to a first storage device or infrastructure component disrupts access to a data object or to a second storage device or infrastructure component of the multi-domain computing environment; a Policy listing that describes characteristics of content-lifecycle management policies that each specify which actions may be performed by certain actors upon certain data items during certain lifecycle phases of those data items; and a Content-Lifecycle Management Log that describes previous activity requests and responses related to the content-lifecycle management of data items in the multi-domain computing environment. The system uses the retrieved information to associate the request with at least one content-lifecycle management policy listed in the ledger, and to then determine whether the at least one policy allows the request to be fulfilled. If the system determines that fulfilling the request would not impermissibly delete or disrupt access to the data object in a manner that violates the at least one policy, the system directs an appropriate data-management technology to perform the requested action on the data object in the particular domain. The system updates the Content-Lifecycle Management Log with details of the request and of the system's response to the request.

DETAILED DESCRIPTION

Figure 1:
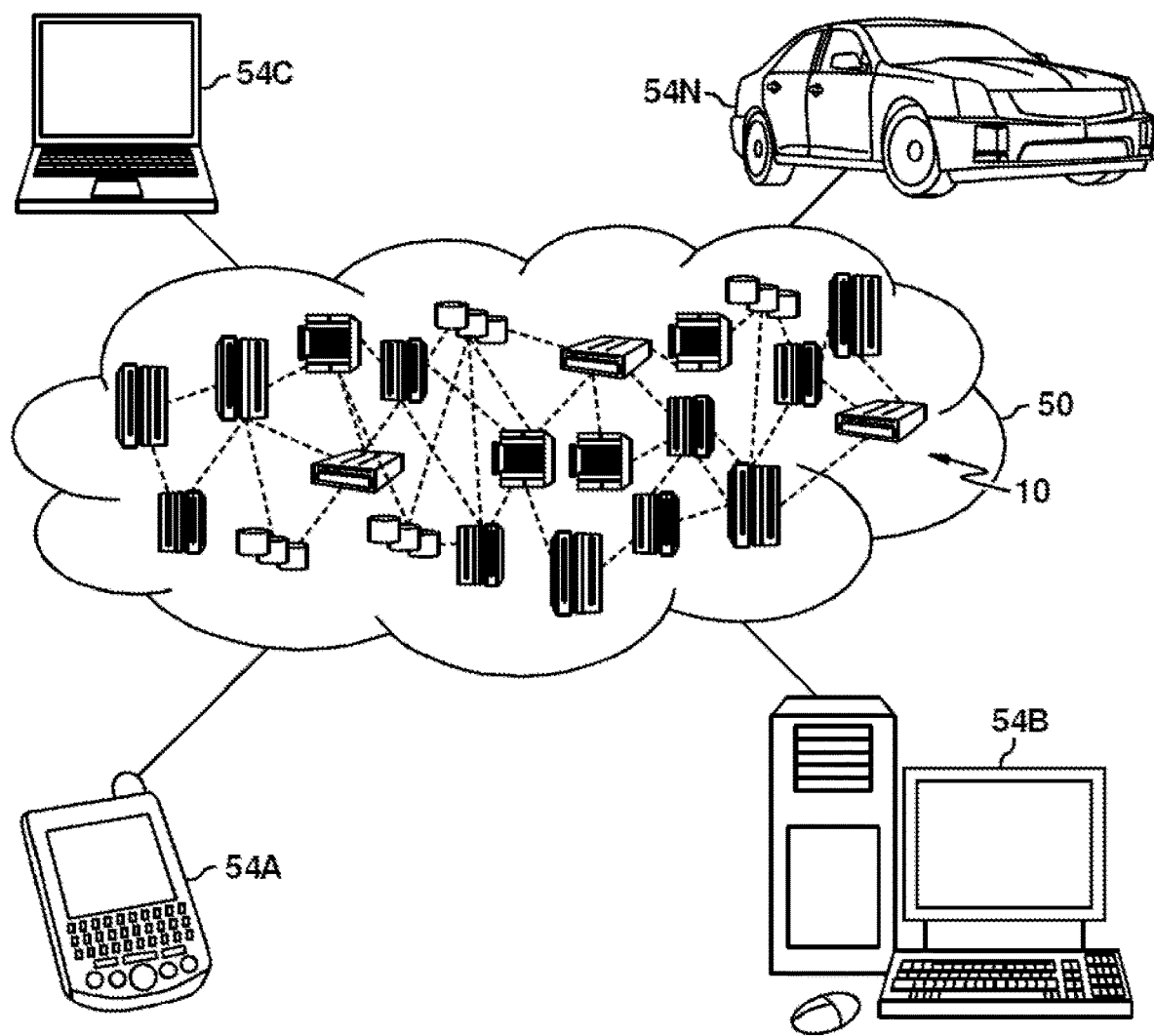
FIG. 1 depicts a cloud computing environment according to an embodiment of the present invention.

A multi-domain or distributed computing environment, such as an enterprise network, a virtualized multi-tenant hosted platform, or a cloud-computing environment, may require specialized technologies to manage data at each stage of the data's lifecycle. Such specialization is necessary when, for example, a network's size, topology, heterogeneity, security constraints, or overall complexity makes scalable custom tools better adapted to performing specific types of operations on large amounts of data, or when different business functions must perform operations on a data item, or conform to different policy constraints, at different points in the item's lifecycle. These operations may include lifecycle-dependent functions like updating production data, archiving or deleting aged records, authenticating a user's write-access, read-access, or data-deletion authority, transaction-logging, offline backup, and disaster recovery.

This compartmentalization can result in the decoupling or desynchronization of the specialized technologies, leading to unintended consequences like data loss. For example, an inappropriate deletion of records from a production database can occur if a storage-management application's data-retention guidelines are not synchronized with the latest updates to a disaster-recovery system's volume-backup schedule. Current content-lifecycle management technologies do not provide a way to avert such inadvertent data deletion by coordinating lifecycle-dependent content-management technologies and tools that run in different domains or are managed by different business functions.

Embodiments of the present invention improve current content-lifecycle management technology by using a distributed, centralized "ledger" data structure to coordinate specialized applications, systems, and other tools that have the ability to delete data. The ledger tracks and coordinates data-removal requests directed to storage repositories in a complex computing environment, regardless of the lifecycle phase of the stored data or the domain of the entity that generates the request. In such embodiments, when a repository receives a request, the physical or virtual storage device is allowed to perform the requested action only if the ledger identifies the requestor as being authorized to initiate the specific type of deletion request. A similar procedure can prevent the accidental disruption of mechanisms that should provide access to a data item, such as when a port or network connection needed to access the item would be disabled by a requested action.

This ledger mechanism provides other benefits, which will be discussed below and in the figures. For example, if a catastrophic data loss occurs, the ledger can survive the catastrophic event if stored in a manner distinct from the storage mechanisms employed for other data. The ledger can then be used to determine which data was lost and to locate any backup copies.

This mechanism can be incorporated into practical applications that improve the functioning of known content-lifecycle management systems. For example, in a multi-domain computing environment where numerous specialized data-management technologies access or process a data element at different phases of the element's lifecycle, known content-lifecycle management systems may be unable to coordinate the specialized technologies to prevent inadvertent data loss or disruption of a legitimate data-access mechanism. This problem is especially likely if the specialized technologies are run from different domains, are expected to service user requests that originate from different domains, are managed by different business functions or service providers, or provide overlapping functionality that requires the technologies to adhere to common guidelines.

In such implementations, embodiments of the present invention improve known content-lifecycle management systems (CLMS) by incorporating a distributed ledger that globally coordinates and manages the specialized technologies throughout the multi-domain environment. This improvement allows the CLMS to ensure that no specialized technology services a data-deletion request or other request that would violate data-management policies, delete data, or make data inaccessible, regardless of the data's lifecycle phase or the domain from which the request originated.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
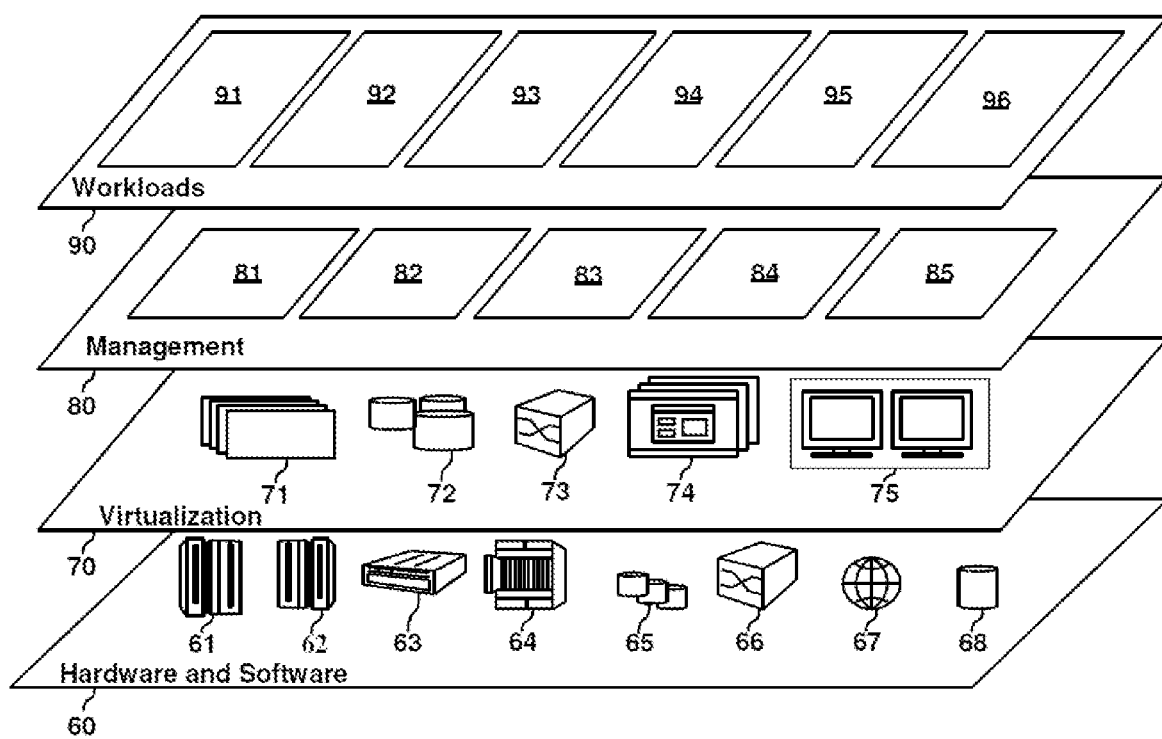
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex cross-domain content-lifecycle management 96.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
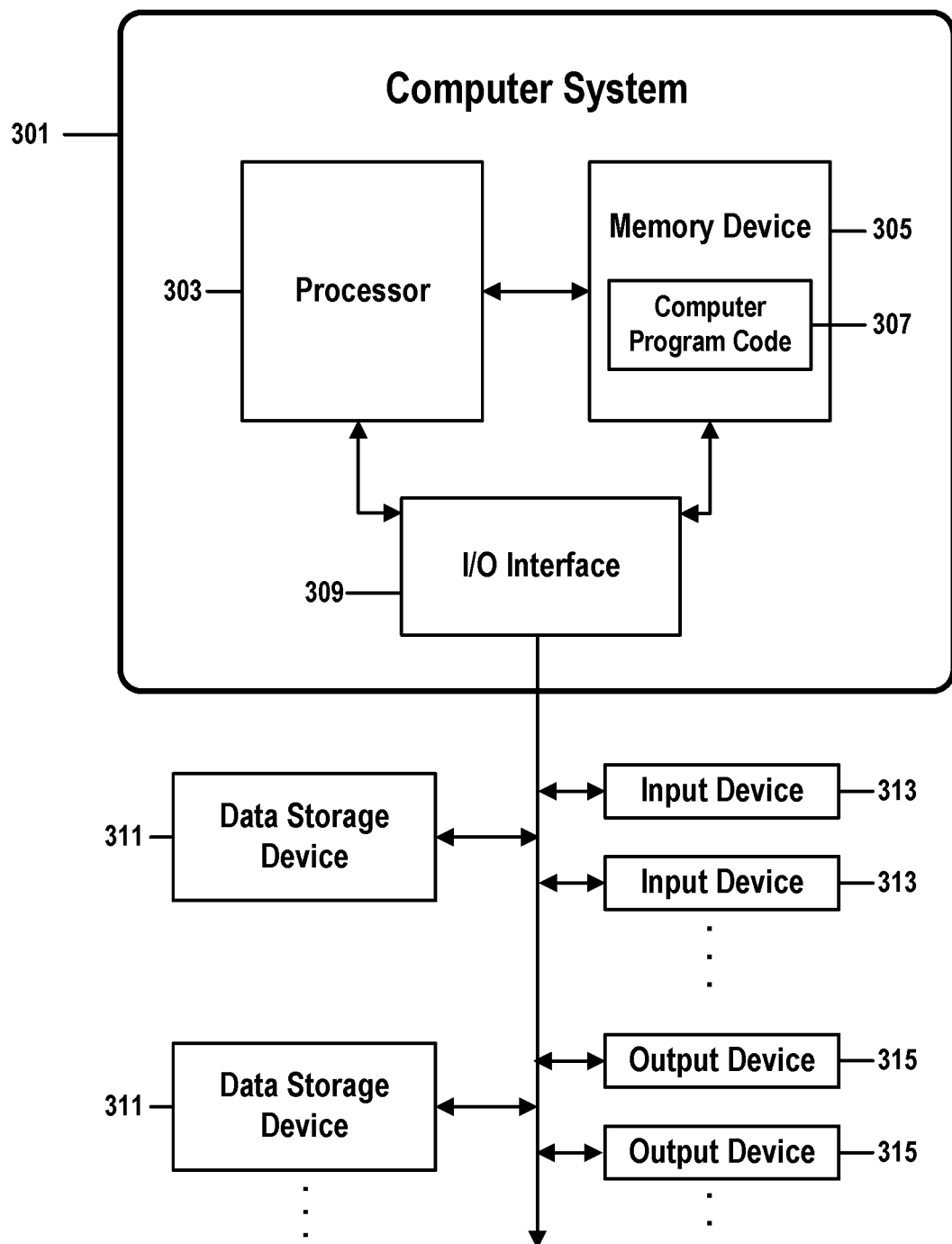
FIG. 3 shows the structure of a computer system and computer program code that may be used to implement a method for cross-domain content-lifecycle management in accordance with embodiments of the present invention.

FIG. 3 shows a structure of a computer system and computer program code that may be used to implement a method for cross-domain content-lifecycle management in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for cross-domain content-lifecycle management in accordance with embodiments of the present invention, and may implement other embodiments described in this specification, including the methods illustrated in FIGS. 1-6. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, where the code in combination with the computer system 301 is capable of performing a method for cross-domain content-lifecycle management.

Any of the components of the present invention could be created, integrated, hosted, maintained, deployed, managed, serviced, supported, etc. by a service provider who offers to facilitate a method for cross-domain content-lifecycle management. Thus the present invention discloses a process for deploying or integrating computing infrastructure, comprising integrating computer-readable code into the computer system 301, where the code in combination with the computer system 301 is capable of performing a method for cross-domain content-lifecycle management.

One or more data storage units 311 (or one or more additional memory devices not shown in FIG. 3) may be used as a computer-readable hardware storage device having a computer-readable program embodied therein and/or having other data stored therein, where the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for cross-domain content-lifecycle management may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for cross-domain content-lifecycle management is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
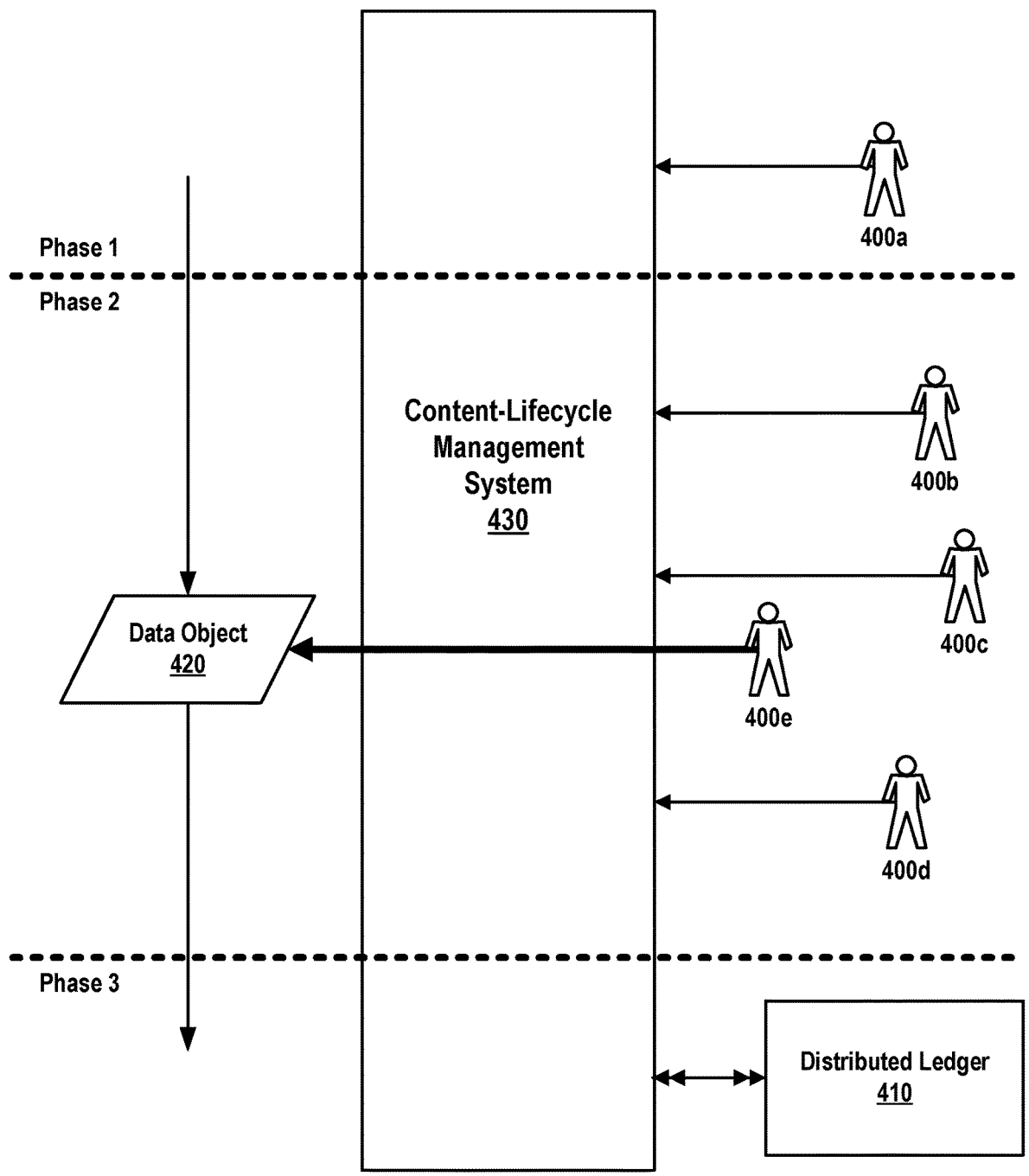
FIG. 4 shows a high-level logical view of a cross-domain content-lifecycle management system within which embodiments of the present invention may be implemented.

FIG. 4 shows a high-level logical view of a content-lifecycle management system within which embodiments of the present invention may be implemented. FIG. 4 contains items 400a-430.

A data object 420 is shown in Phase 2 of its lifecycle, having completed Phase 1 of its lifecycle, and prior to entering Phase 3 of its lifecycle. Data object 420 may be any type of data or content capable of traversing phases of a distinct lifecycle, such as a database record, an audio recording or video clip, a system log, a product specification, a project plan, a marketing presentation, a Web page, advertising literature, or a financial document.

Data objects 420 may be classified or grouped in accordance with certain rules that identify conditions under which a data object 420 may be deleted, revised, copied, or accessed, or conditions under which certain users are allowed to disrupt, reduce, or otherwise interfere with access to a data object 420. In some embodiments, if a data object 420 satisfies criteria for more than one classification or grouping, the system will enforce the most stringent of the satisfied requirements.

These rules may be based on combinations of any characteristics of stored data objects 420 that are known in the art, such as:
- a filename that conforms to a certain file-naming convention, including a filename extension that identifies a type of stored content;
- a location at which a data object 420 is stored, such as a reserved folder, volume, site, or physical storage device;
- a flag set by a file-indexing engine, search engine, or other data-processing software application;
- an identification of a content-creating entity, content-revising entity, software application, business function, or other source of the original version or an updated version of data object 420;
- security or privacy settings of a data object 420; and
- an identification of a data-retention policy or other content-management lifecycle policy 500a-500e that controls an aspect of a data object 420 during one or more phases of object 420's lifecycle.

During each phase of data object 420's lifecycle, actors 400a-400e generate requests to review, edit, delete, or otherwise access the data object 420. These actors 400a-400e may comprise one or more human users, automated applications, computerized systems, extrinsic services, or any other entity capable of requesting permission to access or revise data object 420.

Actors 400a-400e may be located in any domain of the multi-domain computing environment. For example, if data object 420 is a product brief stored on a manufacturing server that is accessible to Sales, Customer Support, and Engineering Departments, an actor 400a-400e may be located in any domain comprised by those three departments. In addition, an actor 400a-400e may be located in other domains of the multi-domain environment. For example, a remote domain restricted to a European Marketing team's local-area network may attempt to access the product-brief data object 420, even though that team is not part of the Sales, Customer Support, or Engineering Departments.

Each request is intercepted by a content-lifecycle management system (CLMS) 430, which determines whether the request should be forwarded to a specialized tool, application, system, or other technology capable of servicing the request. FIG. 4 shows each actor 400a-400e transmitting a data-access request that is intercepted by CLMS 430.

For example, actor 400a had sent a first request while data object 420 was in Phase 1 of its lifecycle, but the first request was intercepted by CLMS 430 and not forwarded to a specialized technology capable of servicing the request. Similarly, actors 400b, 400c, and 400d have respectively submitted second, third, and fourth data-access requests while data object 420 is in Phase 2 of its lifecycle. Again, those three requests were intercepted by CLMS 430, which determined that the requests should not be serviced. Accordingly, the three requests were not forwarded to an appropriate technology capable of servicing the requests.

During the time that data object 420 is in the second phase of its lifecycle, actor 400e sent a fifth request to access data object 420. The CLMS 430, using information stored in its distributed ledger 410 as an Assets Data Model, determined that this request should be serviced and allowed a specialized technology to perform the requested access upon data object 420. Details of this determination and of the internal structure of ledger 410 are described in FIGS. 5A-6.

Distributed ledger 410 and the Assets Data Model it contains may be implemented in any manner known in the art, such as a distributed database, a set of synchronized redundant data repositories, a blockchain network accessible from multiple domains of the computing environment, or a cloud-hosted data structure. In some embodiments, ledger 410 may be located at a remote site that secures its contents even if a catastrophic failure results in loss of data objects 420 or other components of the multi-domain computing environment.

Distributed ledger 410 may be implemented as an internal component of content-lifecycle management system 430, thereby embodying a practical application that comprises an improved method of content-lifecycle management. In other embodiments, all or part of distributed ledger 410 may be implemented as a distinct system or service that is distinct from an existing CLMS 430. In yet other embodiments, distributed ledger 410 may be a more complex data structure, distributed across multiple sites or domains, or integrated into multiple other applications.

Figure 5A:
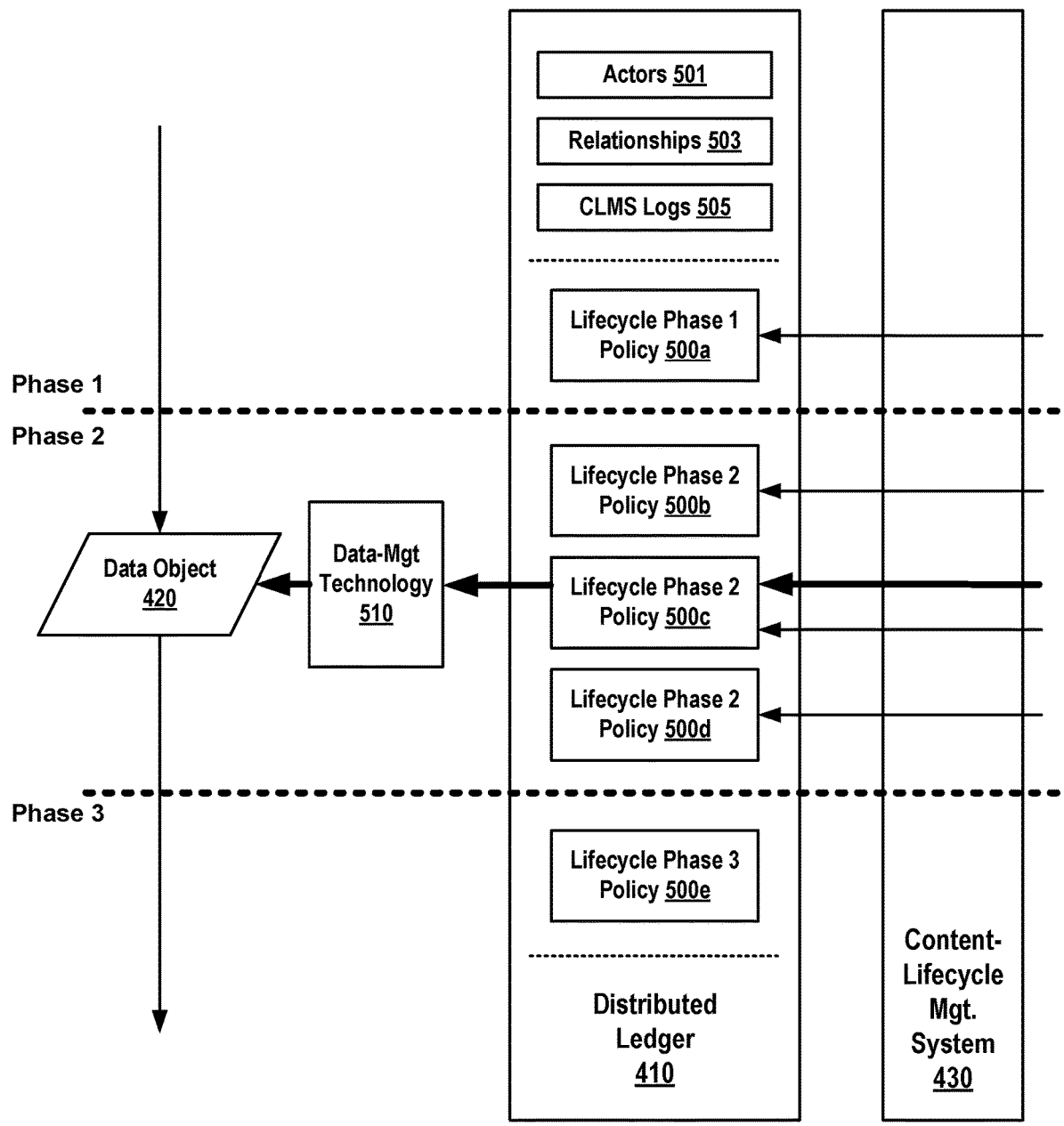
FIG. 5A shows details of a cross-domain content-lifecycle management system that communicates with a distributed ledger module, in accordance with embodiments of the present invention.
Figure 5B:
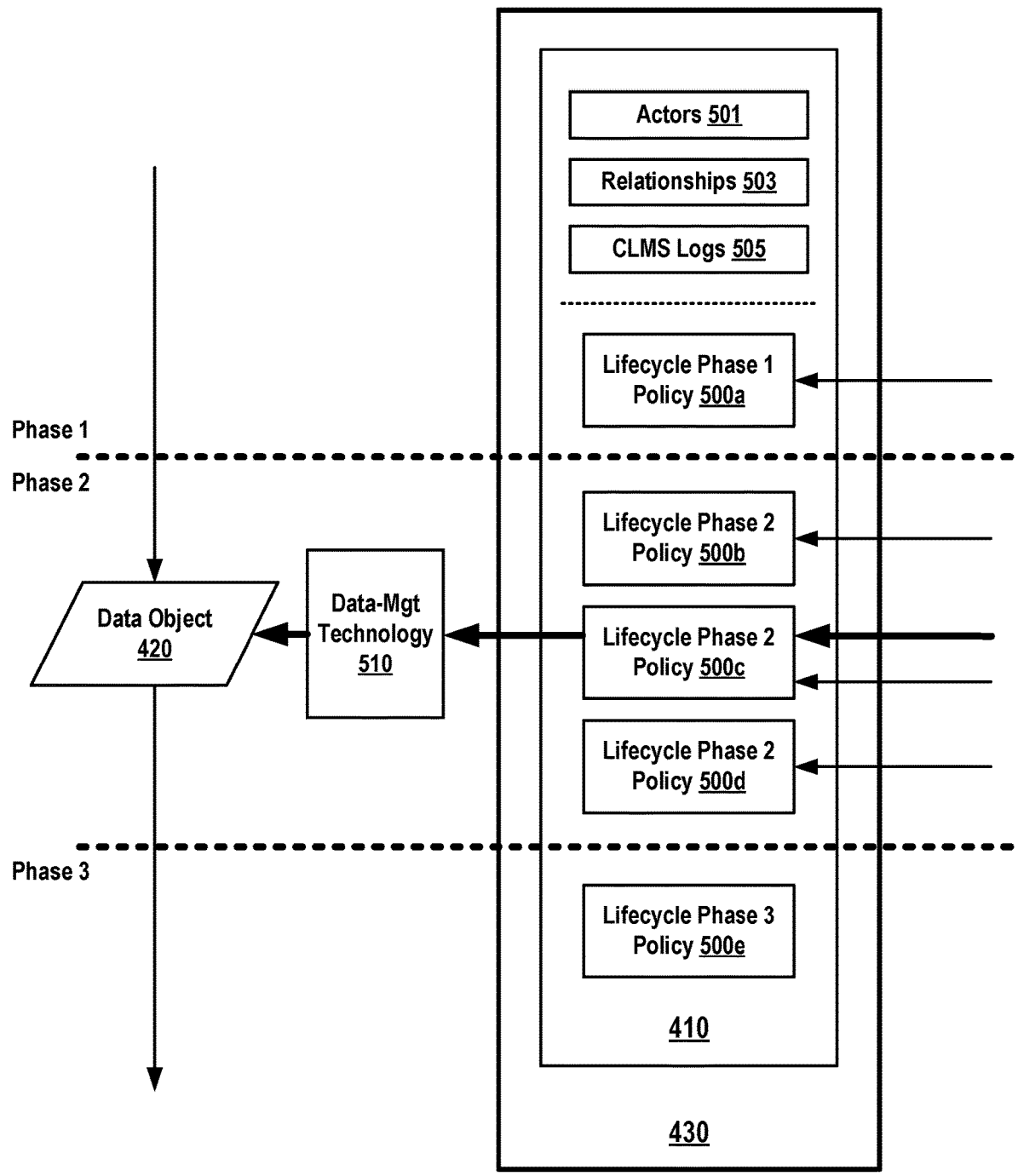
FIG. 5B shows details of a cross-domain content-lifecycle management system into which a distributed ledger is integrated, in in accordance with embodiments of the present invention.

Regardless of implementation details, all embodiments of distributed ledger 410 store, or contain pointers to, certain classes of information that allow CLMS 430 to globally manage specialized content-management technologies throughout multiple domains of the multi-domain computing environment. FIGS. 5A-5B present a more detailed description of ledger 410 internals and FIG. 6 describes steps by which the present invention uses ledger 410 contents to perform these tasks.

FIG. 5A shows details of s cross-domain content-lifecycle management system implemented in accordance with embodiments of the present invention. FIG. 5A contains items 410-430, 500a-500e, 501-505, and 510. Items 410-430 are identical in form and function to similarly numbered items of FIG. 4.

CLMS 430, in response to receiving requests to access data object 420 from actors 400a-400e (as shown in FIG. 4), determines whether each request should be granted by querying distributed ledger 410.

Ledger 410 contains information (or pointers to locations of the information) that the CLMS 430 can use to determine whether a requested action is permissible. This information may be located in, or associated with, any domain of the multi-domain computing environment in which embodiments of the present invention are implemented.

In some embodiments, ledger 410 may be stored as a single data structure or file in a location that is accessible from multiple domains of the multi-domain computing environment. In other embodiments, ledger 410 is distributed across multiple files or data structures throughout the multi-domain computing environment, or at remote sites external to the multi-domain computing environment. The present invention is flexible enough to accommodate implementations of ledger 410 that comprise any sort of physical or logical structure known in the art.

Although the exact contents of the Assets Data Model stored in ledger 410 may be implementation-dependent, in all cases, ledger 410 should contain, or identify sources that contain, at least the following information:

Actor listings 501 that enumerate and describe characteristics of human or computerized actors, such as requestors 400a-400e, that are capable of submitting the requests. Actor listings 501 may organize actors into at least two classes based on each actor's authority to perform certain operations upon certain data objects 420 during certain lifecycle phases. For example, some embodiments may organize actors into: i) Class 1 actors that are authorized to revise data-management policies (such as policies 500a-500e), even if those revisions could result in the expiration or deletion of data objects 420; and ii) Class 2 actors comprising all other actors in the multi-domain computing environment with access to tools capable of deleting or disrupting access to data objects 420. In some embodiments, actor listings 501 may also include other information about each actor, such as the basis by which a particular actor is awarded Class 1 status or information about past or future revalidations of an actor's classification. Examples of Class 2 actors include: system-backup software applications, data-archiving systems, physical-storage devices and systems (such as storage-attached network (SAN) arrays, network-attached storage (NAS) arrays, and object-storage repositories), storage-access components (such as SAN switches, IP network switches, and NAS gateway devices), and product storage-content systems;

Policy listings of lifecycle-phase-specific data-management policies 500a-500e that each identify conditions under which a particular data object may be accessed. Each policy 500a-500e identifies conditions under which actions may be performed by one or more actors 400a-400e upon one or more data objects 420 or types of data objects 420 at one or more particular lifecycle phases of the data objects 420. These conditions may, for example, specify that a request may be serviced only if: i) the requestor is a certain actor or belongs to a certain class of actors; ii) the requestor satisfies certain other criteria, such as being associated with a certain business function, or possessing a certain security-authorization level; iii) the requestor requests a performance of a specific type of action, such as reading, editing, moving, copying, deleting, or changing a characteristic of a data object 420, revising a network topology that changes an ability to access a data object 420, revising another actor's authorization to access object 420, or modifying a policy 500a-500e that controls access to a data object 420; or iv) the data object 420 is in a particular lifecycle phase at the time that the request is received or serviced. Policies may also include generalized data-specific guidelines, such as: data-retention rules, data-age requirements required in order to perform actions on a data object 420 like deleting the object 420 or allowing the object 420 to progress to another lifecycle phase, various data-availability requirements, and data-resilience factors, such as the locations and numbers of copies required for various types of backup or archiving operations. The policy listings may also comprise additional data about a policy 500a-500e, such as a copy of the original version of the policy, a record of the most current version of the policy, or an audit trail that documents each change made to the policy and the actor that authorized the change.

One or more relationships listings 503 that each identify a dependency relationship among storage devices, infrastructure components, data objects 420, and other entities comprised by the multi-domain computing environment. In other words, these relationships allow a CLMS 430 to determine the upstream or downstream effects of performing an operation upon a particular storage or infrastructure component, regardless of whether the affected upstream or downstream components occupy the same domain as the particular component. For example, one relationship documented by the relationships listing 503 could specify that a physical storage device can only store or access a certain class of data objects 420 if a certain SAN (storage-attached network) switch is operational and accessible. Another of the relationships would specify that a server backup cannot be performed unless the physical storage device is operational and accessible and contains enough unused capacity to store the backup file; and One or more content-lifecycle management logs 505 that provide records of activities related to the content-lifecycle management of data objects 420. For example, one log 505 could track attempts to perform potentially destructive operations on a data object 420, including an identification of the actors requesting each operation, whether the requests complied with an applicable lifecycle-phase policy, and whether the requested operation was performed. Another log might track attempts to perform potentially disruptive operations on any storage or infrastructure component of the multi-domain computerized environment. Here, a disruptive operation is one that, rather than deleting a data object 420, would instead disrupt users' ability to access the data object 420. Again, such a log might further identify requesting actors, whether each request complied with an applicable lifecycle-phase policy, and whether the requested operation was performed.

FIG. 5A shows examples of this procedure by elaborating upon the example of FIG. 4. Here, the request received from actor/user 400a during phase 1 of data object 420's lifecycle is blocked by lifecycle policy 500a. Similarly, requests received from actors 400b, 400c, and 400d during phase 2 of data object 420's lifecycle are blocked, respectively, by lifecycle policies 500b, 500c, and 500d. As data object 420 progresses through further lifecycle phases 3 and later phases, other policies, such as lifecycle policy 500e, control whether specific requests received during those later phases are permitted or blocked.

The request from actor 400e is received by CLMS 430, which checks the phase 2 lifecycle policy 500c listing contained in ledger 410 to determine whether the request should be serviced. In FIG. 5A, this request is allowed by policy 500c and the request is forwarded by CLMS 430 to the appropriate data-management technology 510, which performs the requested action upon data object 420.

FIG. 5B shows details of s cross-domain content-lifecycle management system implemented in accordance with embodiments of the present invention. FIG. 5B contains items 410-430, 500a-500e, 501-505, and 510. Except for the topology of items 410 and 430 described below, these items are identical in form and function to similarly numbered items of FIG. 5A.

FIGS. 4 and 5A show embodiments in which distributed ledger 410 is a distinct component of the multi-domain computing environment that is external to a legacy content-lifecycle management system 430. FIG. 5B, however, shows an embodiment in which ledger 430 is an integral component internal to CLMS 430. In such embodiments, ledger 430 may be considered to be an improvement to known CLMS systems.

FIG. 5B shows a procedure that is otherwise identical to that of FIG. 5A, in which actors 400a-400e submit requests to perform actions that are potentially destructive or disruptive to data object 420. As in FIG. 5A, CLMS 430 determines whether to forward these requests to appropriate data-management technologies 510 as a function of conditions specified by policies 500a-500e. As in FIG. 5A, CLMS 430 reads this information from ledger 410 and may also read from the ledger 410 other information pertinent to making this determination, such as listings 501 of information about actors, relationship listings 503, and stored logs and other historical data 505.

Figure 6:
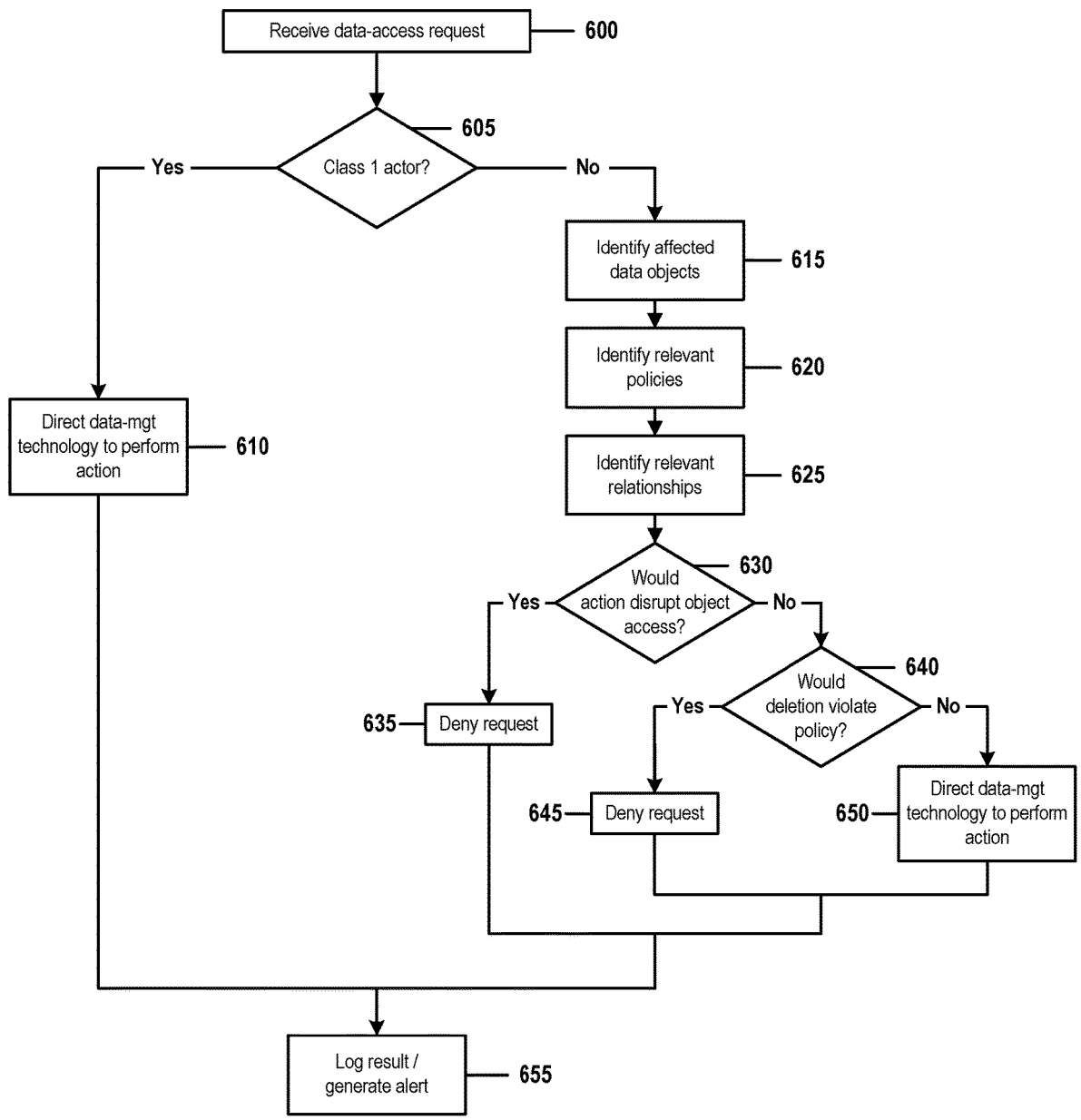
FIG. 6 is a flow chart that illustrates the steps of a method for cross-domain content-lifecycle management in accordance with embodiments of the present invention.

FIG. 6 is a flow chart that illustrates the steps of a method for cross-domain content-lifecycle management in accordance with embodiments of the present invention. FIG. 6 contains steps 600-655, which may be performed by embodiments implemented in accordance with the platforms and structures of FIGS. 1-5B.

In step 600, content-lifecycle management system (CLMS) 430 receives a request from an actor 400a-400e to perform an action upon a data object 420 during a particular, or current, phase of the data object 420's lifecycle. Data object 420 is stored on, maintained by, or accessible from at least one domain of a multi-domain computing environment.

In step 605, the CLMS 430 determines whether the requesting actor 400a-400e is authorized to perform the requested action without further evaluation. In some embodiments, this determination may be made by referring to an actors log 501 of an Assets Data Model stored in distributed ledger 410. For example, if an embodiment identifies Class 1 actors as being authorized to perform all data-management operations, including the ability to revise content-lifecycle management policies that define which actions are permissible, then determining that the requestor is a Class 1 actor would identify that the requestor is authorized to perform the requested action without further evaluation. The CLMS 430 would then, in step 610, would authorize the requested action and direct an appropriate content-management technology to perform the requested action. If, however, the embodiment identifies that the requestor is a Class 2 actor (or an actor of any other non-Class 1 class), then the CLMS 430 would continue with steps 615-650 before concluding with step 655.

As described in FIGS. 5A-5B, ledger 410 may be an internal component of CLMS 430 or a distinct content-lifecycle management component that is external to an existing CLMS 430. In either case, ledger 410 comprises sets of information that in aggregate comprise the Assets Data Model. CLMS 430 uses this model to identify characteristics of actors, data objects 420, current and past versions of the content-lifecycle management policies 500a-500e, and relationships among storage components and infrastructure components of the multi-domain computing environment. In particular, CLMS 430 performs the determining of step 605 by retrieving from the Assets Data Model the class or other information indicating an authorization level of the requesting actor.

In step 615, the CLMS 430 identifies the data object or objects 420 that would be affected by performing the requested action. This identification may be performed by means known in the art, such as by extracting the identification from the received request or by inferring or identifying the object or objects 420 from information stored in the Assets Data Model of ledger 410.

In step 620, the CLMS 430 identifies which content-lifecycle management policies 500a-500e are applicable to the requested action. This identification is performed by referring to the policy listings comprised by the Assets Data Model of ledger 410. These listings identify which policies apply to the object or objects 420 identified in step 615 at each object's current lifecycle phase. The applicable policies may also be identified as functions of a characteristic of the requestor and of the type of action being requested.

In step 625, the CLMS 430 identifies relationships among logical or physical storage devices or infrastructure components of the multi-domain computing environment are applicable to the requested action. This identification is performed by referring to the relationships listings 503 comprised by the Assets Data Model of ledger 410. These listings identify dependencies and other relationships among these components, indicating, among other things, which data objects 420 would become all or partly inaccessible if a particular component is disabled or otherwise compromised by performing the requested action.

In step 630, CLMS 430 uses the determinations and information identified in steps 615-625 to determine whether performing the requested action would impermissibly disrupt access to the data object or objects 420 identified in step 615. The requested action may be deemed to be impermissible if one or more of the applicable content-lifecycle management policies identified in step 620 does not permit an actor with credentials like that of the requestor to perform actions that would disrupt access to the object or objects 420 during the object or objects 420's current lifecycle.

In some embodiments, the requested action is deemed impermissible solely because the relationships listing 503 allows CLMS 430 to determine that performing the requested action would disrupt or otherwise compromise access to the object or objects 420 in a manner that would violate one of the applicable content-lifecycle management policies identified in step 620.

In either case, if CLMS 430 in step 630 identifies the potential for an impermissible disruption, the method of FIG. 6 continues with step 635, in which CLMS 430 does not authorize a performance of the requested action and does not direct a content-management technology or other type of data-management technology to perform the requested action.

In step 640, if CLMS 430 in step 630 determined that performing the requested action would not impermissibly disrupt access to the identified data object or objects 420, CLMS 430 next determines whether performing the requested action would impermissibly delete one or more of the data object or objects 420 identified in step 615.

This determination may be made as a function of information retrieved or inferred from the Assets Data Model of ledger 410 in steps 615-625. For example, CLMS 430 may determine that performing the requested action would impermissibly delete the object or objects 420 if the actors listing 501 or a policy 500a-500e specifies that the requestor's class does not permit it to delete data similar to that of data object or objects 420. Similarly, CLMS 430 may determine that performing the requested action would impermissibly delete object or objects 420 if a policy 500a-500e specifies that data object or objects cannot be deleted by the requestor from their current location during their current lifecycle phase.

If the requested action, rather than directly performing a deletion, would instead revise, copy, move, backup, archive, or perform some other operation upon data object or objects 420, CLMS 430 in step 640 would perform an analogous analysis in order to determine whether a policy 500a-500e or other information retrieved from the ledger 410 in steps 615-625 would bar the performance of that action upon the data object or objects 420 identified in step 615 by the requestor during the current lifecycle phase of the data object or objects 420.

If CLMS 430 determines in step 640 that performing the requested action would violate one or more of the identified policies 500a-500e, then CLMS 430 denies the request in step 645 in a manner similar to that of steep 635. If, however, CLMS 430 determines in step 640 that performing the requested action would not violate one or more of the identified policies 500a-500e, then CLMS 430 would authorize the requested action and direct the data-management technology or component to perform the requested action in a manner similar to that of step 610.

In step 655, the system updates the Assets Data Model to record the results of the current iteration of the method of FIG. 6. For example, if the requested action is authorized in step 610 or 650, CLMS 430 in step 655 would update the logs 503, as described in FIG. 5A, to record characteristics of the request and of the requested action, the performance of the requested action, and conditions that led to the authorization of the requested action. Similarly, if the requested action is denied in step 635 or 645, CLMS 430 in step 655 would update the logs 503, as described in FIG. 5A, to record characteristics of the request and of the requested action, the denial of the requested action, and conditions that led CLMS 430 to deny the requested action. In the case of a denial, CLMS 430 would also, in some embodiments, alert appropriate staff or systems that an attempt was made to perform an impermissible operation.

One advantage of embodiments that comprise methods similar to that of FIG. 6 is that the use of a globally accessible distributed ledger 410, not constrained to any single domain of the multi-domain computing environment, allows an improved CLMS 430 to coordinate and manage content-management technologies throughout all phases of a data object 420's lifecycle, regardless of which domain or domains the object 420 occupies during a particular lifecycle phase. This allows CLMS 430 to provide true cross-domain content-lifecycle management without risk that a first content-management technology in one domain might inadvertently cause a second content-management technology in a different domain to impermissibly delete a data object 420 or to disrupt access to the data object 420.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A content-lifecycle management system comprising a processor, a memory coupled to the processor, and a computer-readable hardware storage device coupled to the processor, the storage device containing program code configured to be run by the processor via the memory to implement a method for cross-domain content-lifecycle management, the method comprising:

receiving from a requestor a request to perform an action upon a data object, where the data object is accessible in a particular domain of a multi-domain computing environment, where the cross-domain ledger stores:

an Actors listing that describes characteristics of actor entities capable of requesting access to one or more data items in the multi-domain computing environment, a Relationships listing that identifies dependency relationships among storage devices, infrastructure components, and data items comprised by the multi-domain computing environment, where each dependency relationship specifies that an inability to access a first storage device or infrastructure component of the multi-domain computing environment disrupts access to a data object of the multi-domain computing environment or to a second storage device or infrastructure component of the multi-domain computing environment, a Policy listing that describes characteristics of the at least one content-lifecycle management policy, and a Content-Lifecycle Management Log that describes activities related to the content-lifecycle management of data items comprised by the multi-domain computing environment, where the activities comprise previous requests to perform an action upon a data object that is accessible in the multi-domain computing environment and responses generated by the CLMS in response to the previous requests, and where the Content-Lifecycle Management Log comprises an audit trail that describes each previous version of the at least one content-lifecycle management policy;

retrieving, from a cross-domain ledger accessible from multiple domains of the computing environment, information that associates the request with at least one content-lifecycle management policy, where the at least one policy identifies one or more permissible actions that may be performed on the data object by the requestor in the particular domain during the data object's current lifecycle phase;

determining, as a function of the retrieved information, whether the requested action is permitted by the at least one policy; and when determining that the requested action is permitted by the at least one policy, directing a data-management technology to perform the requested action upon the data object.

2. The system of claim 1, where the determining further comprises:
   determining whether performing the requested action would delete the data object in a manner that is permitted by the at least one policy.

3. The system of claim 1, where the determining further comprises:
   determining whether performing the requested action would disrupt an ability to access to the data object.

4. The system of claim 1, where the determining further comprises:
   determining whether the requestor is classified as a Class 1 actor, where Class 1 actors are authorized to revise the at least one policy; and
   if determining that the requestor is a Class 1 actor, automatically deeming that the requested action is permitted by the at least one policy.

5. The system of claim 1, where the cross-domain ledger is a distributed data structure that is not stored in its entirety in any single domain of the multiple-domain system.

6. The system of claim 5, where the distributed data structure is a blockchain network.

7. A method for cross-domain content-lifecycle management, the method comprising:
   a content-lifecycle management system receiving from a requestor a request to perform an action upon a data object, where the data object is accessible in a particular domain of a multi-domain computing environment;
   where the data object is accessible in a particular domain of a multi-domain computing environment, where the cross-domain ledger stores:
   an Actors listing that describes characteristics of actor entities capable of requesting access to one or more data items in the multi-domain computing environment,
   a Relationships listing that identifies dependency relationships among storage devices, infrastructure components, and data items comprised by the multi-domain computing environment, where each dependency relationship specifies that an inability to access a first storage device or infrastructure component of the multi-domain computing environment disrupts access to a data object of the multi-domain computing environment or to a second storage device or infrastructure component of the multi-domain computing environment,
   a Policy listing that describes characteristics of the at least one content-lifecycle management policy, and a Content-Lifecycle Management Log that describes activities related to the content-lifecycle management of data items comprised by the multi-domain computing environment, where the activities comprise previous requests to perform an action upon a data object that is accessible in the multi-domain computing environment and responses generated by the CLMS in response to the previous requests, and
   where the Content-Lifecycle Management Log comprises an audit trail that describes each previous version of the at least one content-lifecycle management policy;
   the system retrieving, from a cross-domain ledger accessible from multiple domains of the computing environment, information that associates the request with at least one content-lifecycle management policy, where the at least one policy identifies one or more permissible actions that may be performed on the data object by the requestor in the particular domain during the data object's current lifecycle phase;
   the system determining, as a function of the retrieved information, whether the requested action is permitted by the at least one policy; and
   if when determining that the requested action is permitted by the at least one policy, the system directing a data-management technology to perform the requested action upon the data object.

8. The method of claim 7, where the determining further comprises:
   determining whether performing the requested action would delete the data object in a manner that is permitted by the at least one policy.

9. The method of claim 7, where the determining further comprises:
   determining whether performing the requested action would disrupt an ability to access to the data object.

10. The method of claim 9, where the determining further comprises:
    determining whether the requestor is classified as a Class 1 actor, where Class 1 actors are authorized to revise the at least one policy; and
    if determining that the requestor is a Class 1 actor, automatically deeming that the requested action is permitted by the at least one policy.

11. The method of claim 9, where the cross-domain ledger is a distributed data structure that is not stored in its entirety in any single domain of the multiple-domain system.

12. The method of claim 9, further comprising providing at least one support service for at least one of creating, integrating, hosting, maintaining, and deploying computer-readable program code in the computer system, where the computer-readable program code in combination with the computer system is configured to implement the receiving, the retrieving, the determining, and the directing.

13. A computer program product, comprising a computer-readable hardware storage device having a computer-readable program code stored therein, the program code configured to be executed by a content-lifecycle management system comprising a processor, a memory coupled to the processor, and a computer-readable hardware storage device coupled to the processor, the storage device containing program code configured to be run by the processor via the memory to implement a method for cross-domain content-lifecycle management, the method comprising:
    receiving from a requestor a request to perform an action upon a data object, where the data object is accessible in a particular domain of a multi-domain computing environment, where the cross-domain ledger stores:
    an Actors listing that describes characteristics of actor entities capable of requesting access to one or more data items in the multi-domain computing environment,
    a Relationships listing that identifies dependency relationships among storage devices, infrastructure components, and data items comprised by the multi-domain computing environment, where each dependency relationship specifies that an inability to access a first storage device or infrastructure component of the multi-domain computing environment disrupts access to a data object of the multi-domain computing environment or to a second storage device or infrastructure component of the multi-domain computing environment,
    a Policy listing that describes characteristics of the at least one content-lifecycle management policy, and a Content-Lifecycle Management Log that describes activities related to the content-lifecycle management of data items comprised by the multi-domain computing environment, where the activities comprise previous requests to perform an action upon a data object that is accessible in the multi-domain computing environment and responses generated by the CLMS in response to the previous requests, and where the Content-Lifecycle Management Log comprises an audit trail that describes each previous version of the at least one content-lifecycle management policy;

retrieving, from a cross-domain ledger accessible from multiple domains of the computing environment, information that associates the request with at least one content-lifecycle management policy, where the at least one policy identifies one or more permissible actions that may be performed on the data object by the requestor in the particular domain during the data object's current lifecycle phase;

determining, as a function of the retrieved information, whether the requested action is permitted by the at least one policy; and when determining that the requested action is permitted by the at least one policy, directing a data-management technology to perform the requested action upon the data object.

14. The computer program product of claim 13, where the determining further comprises:
   determining whether performing the requested action would delete the data object in a manner that is permitted by the at least one policy.

15. The computer program product of claim 13, where the determining further comprises:
   determining whether performing the requested action would disrupt an ability to access to the data object.

16. The computer program product of claim 13, where the determining further comprises:
   determining whether the requestor is classified as a Class 1 actor, where Class 1 actors are authorized to revise the at least one policy; and
   if determining that the requestor is a Class 1 actor, automatically deeming that the requested action is permitted by the at least one policy.

* * * * *